United States Patent
Lin et al.

(10) Patent No.: US 6,617,732 B1
(45) Date of Patent: Sep. 9, 2003

(54) MAGNETIC BEARING STRUCTURE

(75) Inventors: Kuo-cheng Lin, Taoyan Shien (TW); Te-tsai Chuang, Taoyan Shien (TW); Wen-shi Huang, Taoyan Shien (TW); I-hsuan Tsai, Taoyan Shien (TW)

(73) Assignee: Delta Electronics, Inc., Taoyan Shien (TW)

( * ) Notice: Subject to any disclaimer, the term of this patent is extended or adjusted under 35 U.S.C. 154(b) by 0 days.

(21) Appl. No.: 09/507,538

(22) Filed: Feb. 18, 2000

(30) Foreign Application Priority Data

Dec. 10, 1999 (TW) ..................... 088121834 A

(51) Int. Cl.[7] ............................................. H02K 7/09
(52) U.S. Cl. ............................................. 310/90.5
(58) Field of Search ........................ 310/90.5, 90.74; 384/110, 193; 104/283

(56) References Cited

U.S. PATENT DOCUMENTS

| | | | | |
|---|---|---|---|---|
| 3,493,275 A | * | 2/1970 | Stone ..................... | 310/90.5 |
| 3,598,456 A | * | 8/1971 | Love ..................... | 310/90.5 |
| 3,663,075 A | * | 5/1972 | Kronenberg ............ | 310/90.5 |
| 3,732,445 A | * | 5/1973 | Laing ..................... | 310/90 |
| 3,934,950 A | * | 1/1976 | Kuhlmann ............... | 310/90.5 |
| 5,124,605 A | * | 6/1992 | Bitterly et al. .......... | 310/74 |
| 5,314,868 A | * | 5/1994 | Takahata et al. ........ | 505/166 |
| 5,873,657 A | * | 2/1999 | Lee ....................... | 384/110 |
| 6,127,756 A | * | 10/2000 | Iwaki et al. ............. | 310/90 |

FOREIGN PATENT DOCUMENTS

JP          04078317     *  3/1992

* cited by examiner

*Primary Examiner*—Joseph Waks
(74) *Attorney, Agent, or Firm*—Birch, Stewart, Kolasch & Birch, LLP

(57) ABSTRACT

A magnetic bearing structure is used in a rotating device that includes a bearing base, a set of coils around a stator mounted on the bearing base, and a rotation shaft mounted on a rotor so that when the set of coils is excited with an electrical current, the rotor rotates. The magnetic bearing structure includes a magnetic shaft attachment in a concave or convex form and fixed on the rotation shaft; and a magnetic stator attachment in a concave or convex form and fixed to the magnetic shaft attachment; wherein the magnetic bearing structure is used to control the position of the rotor in both a radial direction and an axial direction by repulsive magnetic forces produced between the magnetic shaft attachment interacts with the magnetic stator attachment.

6 Claims, 3 Drawing Sheets

MAGNETIC BEARING STRUCTURE

BACKGROUND OF THE INVENTION

1. Field of Invention

This invention relates to a rotating apparatus and, in particular, to a magnetic bearing structure.

2. Description of the Related Art

In a conventional bearing for supporting a rotor to rotate, a sleeve bearing as shown in FIG. 1 is adopted. A pair of sleeves 10 is provided in the radial direction. The rotor is in direct contact with the bearing while rotating; thus friction, noise, and vibration are generated. This increases the power consumption and lowers the lifetime of the bearing. Since the rotation speed cannot be increased, the lower rotation speed cannot meet the high vacuum requirement of a vacuum system. Moreover, the lubricant between the rotor and the bearing is likely to be squeezed out when the rotor rotates, therefore, it cannot meet a highly clean environment requirement, e.g., in a clean room.

To overcome the above problems about friction, rotation speed, lifetime, and cleanness, magnetic suspension has been widely used in some industries for supporting rotors in a non-contact way. Using the frictionless feature of the magnetic bearing, the rotation speed can be increased and this can be applied in semiconductor manufacturing equipment that needs high speed rotating vacuum apparatuses to meet the requirements of processes to be proceeded in high vacuum states. It can also be applied in the fan motor of a ventilating device in a computer system. By increasing the rotation speed of the fan motor, the convection efficiency can be increased. Also, since the magnetic bearing supports the rotor by the magnetic force, lubricant is not needed. This can avoid environmental contamination by the lubricant for use in a conventional rotor. Thus, the invention can be applied in the carrier system or manufacturing apparatuses in a clean room of high cleanness.

Referring to FIG. 2, a conventional magnetic bearing structure of a high speed rotating device comprises a bearing base 20, a set of coils 30 around a stator 40 mounted on the bearing base 20, and a rotation shaft 50 made of a permanent magnet mounted on a rotor 60. When the coils 30 are excited with an electrical current, the rotor 60 rotates with respect to the stator 40. The conventional magnetic bearing structure consists of five sets of bearings. The axial direction (z-axis) is provided with a set of thrust magnetic bearings 70 made of permanent magnets. The upper and lower sides in the radial direction (x-axis and y-axis) are provided with radial magnetic bearings 80, 90 (not shown) made of permanent magnets. They are controlled independently in five axial directions. In particular, the position of the rotor 60 in the radial direction is controlled by the bearings 80, 90. When the rotor 60 deviates from its equilibrium position, the magnetic repulsion generated by the permanent magnets in the opposite directions pushes the rotor 60 back to its equilibrium position. A magnetic clearance kept by the magnetic repulsion between the rotor 60 and the bearings 70, 80, 90 prevents the bearings from direct contact with the rotor while keeping the rotor in equilibrium. The friction between the rotor 60 and the bearings 70, 80, 90 can be avoided and therefore the noise and vibration caused by friction become less. In addition, the conventional magnetic bearing structure can lower the power consumption, and increase the rotation speed of the rotor 60 and the lifetime of the bearings.

However, in this conventional magnetic bearing structure, the bearings are controlled independently in five axial directions and the bearings have to be handled in five axial directions during manufacturing and assembling. Therefore, it is considered that the structure is complicated and incurs a high manufacturing cost.

SUMMARY OF THE INVENTION

An object of this invention is to provide a magnetic bearing structure, which utilizes non-contact magnetic force to control the position of a rotor to avoid friction, to lower noise, vibration and power consumption, to increase the rotational speed and the lifetime of the bearing, and to lower the manufacturing cost.

In a preferred embodiment of the invention, a magnetic bearing structure is provided. This structure modifies the conventional five sets of independently controlled bearings into a set of bearing so as to control the position of the rotor in both the radial direction and the axial direction. The set of bearing can be used in a high speed rotating device, which comprises a bearing base, a set of coils around a stator mounted on the bearing base, and a rotation shaft on a rotor. When the set of coils is excited with an electrical current, the rotor rotates in relation to the stator. Moreover, the magnetic bearing structure comprises: a magnetic shaft attachment in a convex form and fixed on the outer side of the rotation shaft, and a magnetic stator attachment in a concave form and fixed on the inner side of the stator, wherein the magnetic bearing structure is used to control a position of the rotor in both a radial direction and an axial direction by repulsive magnetic forces produced between the magnetic shaft attachment and the magnetic stator attachment.

Another preferred embodiment of this invention provides a magnetic bearing structure. This structure modifies the conventional five sets of independently controlled bearings into a set of bearing so as to control the position of the rotor in both the radial direction and the axial direction. The set of bearing can be used in a high speed rotating device, which comprises a bearing base, a set of coils around a stator mounted on the bearing base, and a rotation shaft on a rotor. When the set of coils is excited with an electrical current, the rotor rotates in relation to the stator. Moreover, the set of bearing comprises: a magnetic shaft attachment in a concave form and fixed around the outer side of the rotation shaft, and a magnetic stator attachment in a convex form and fixed on the inner side of the stator, wherein the magnetic bearing structure is used to control a position of the rotor in both a radial direction and an axial direction by repulsive magnetic forces produced. between the magnetic shaft attachment and the magnetic stator attachment.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow, and the drawings which are given by way of illustration only, and thus are not limitative of the present invention, wherein.

DETAILED DESCRIPTION OF THE INVENTION

Figure 1:
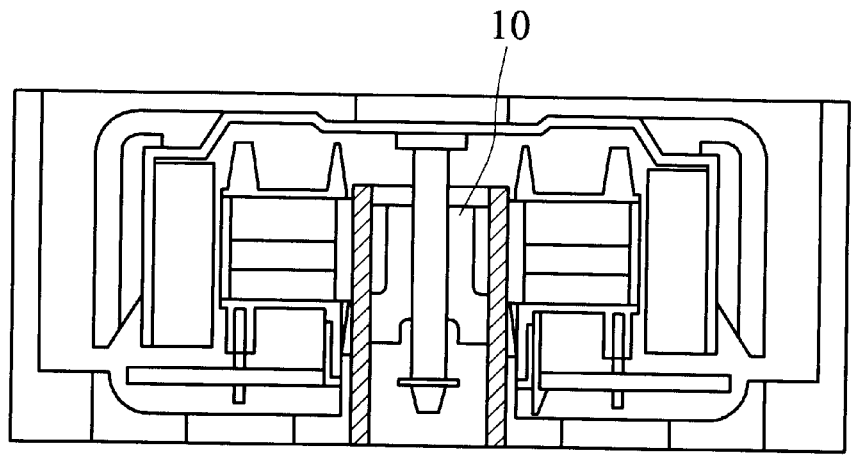
FIG. 1 is a cross-sectional view showing a cvonventional sleeve bearing structure.
Figure 2:
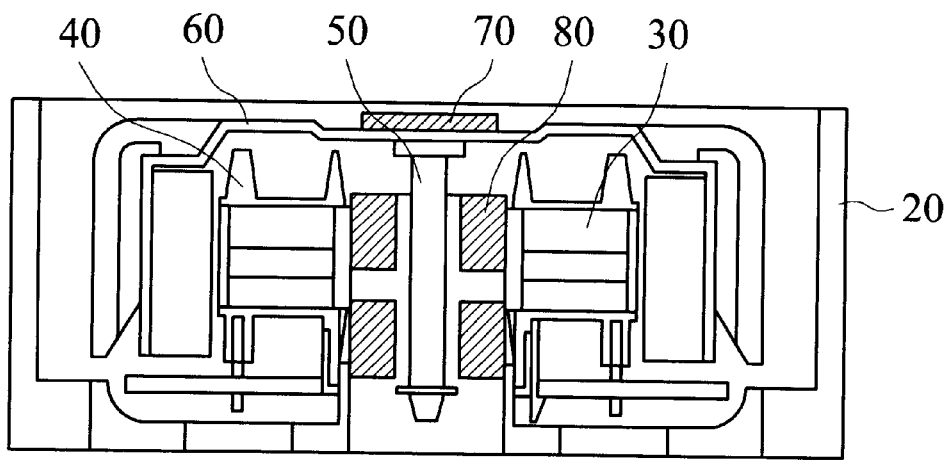
FIG. 2 is a cross-sectional view showing a conventional magnetic bearing structure.
Figure 3:
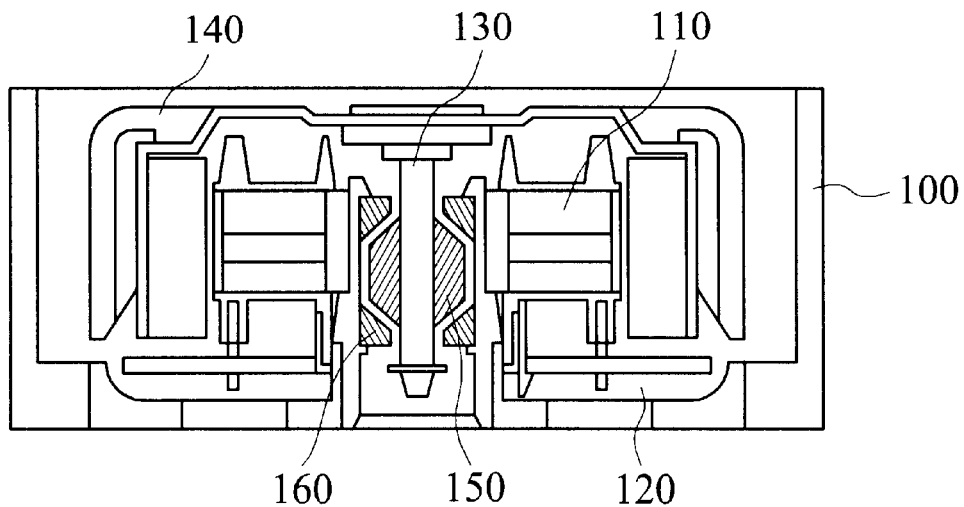
FIG. 3 is a cross-sectional view showing a magnetic bearing structure in accordance with a preferred embodiment of the invention.

Referring to FIG. 3, a magnetic bearing structure in accordance with a preferred embodiment of the present invention for use in a high speed rotational device comprises a bearing base 100, a set of coils 110 around a stator 120 mounted on said bearing base 100, and a rotation shaft 130 on a rotor 140. When the set of coils 110 is excited with an electrical current, the rotor 140 rotates in relation to the stator 120. In particular, the magnetic bearing structure comprises: a magnetic shaft attachment 150, e.g. made of a permanent magnet, in a convex form and fixed on the outer surface of the rotation shaft 130, and a magnetic stator attachment 160, e.g. made of a permanent magnet, in a concave form and fixed on the inner side of the stator 120.

Figure 4:
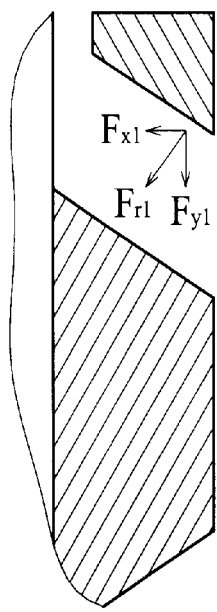
FIG. 4 is a schematic diagram of the component forces Fx1, Fy1 acting on the rotor by the radial repulsive force Fr1 generated between the rotation shaft connection portion and the stator connection portion.

In this embodiment, a clearance is formed between the shaft attachment 150 and the stator attachment 160 due to the repulsive magnetic force generated between them. When the rotor 140 deviates from its equilibrium position, the repulsive magnetic force Fr1, as shown in FIG. 4, generated between the shaft attachment 150 and the stator attachment 160 becomes greater as the magnetic force is proportional to the inverse of the square of the distance. The component force Fx1 in the radial direction pushes the rotor 140 back to its equilibrium position in the radial direction, and the component force Fy1 pushes the rotor 140 back to its equilibrium position in the axial direction.

Figure 5:
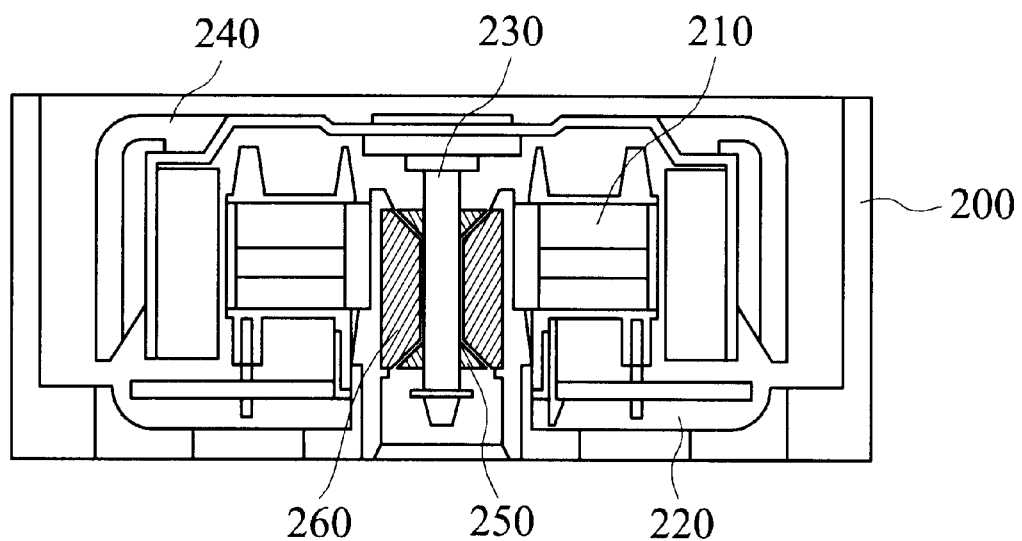
FIG. 5 is a cross-sectional view showing a magnetic bearing structure in accordance with another preferred embodiment of the invention.

Referring to FIG. 5, the magnetic bearing structure for use in a high speed rotational device in accordance with another embodiment of the invention comprises a bearing base 200, a set of coils 210 around a stator 220 which is mounted on the bearing base 200, and a rotation shaft 230 on a rotor 240. When the set of coils 210 is excited with an electrical current, the rotor 240 rotates with respect to the stator 220. In particular, the magnetic bearing structure comprises: a magnetic shaft attachment 250, e.g. made of a permanent magnet, in a concave form and fixed on the outer side of the rotation shaft 230, and a magnetic stator attachment 260, e.g. made of a permanent magnet, in a convex form and fixed around the inner side of the stator 220.

Figure 6:
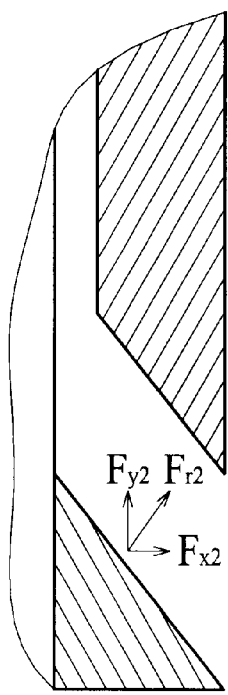
FIG. 6 is a schematic diagram of the component forces Fx2, Fy2 acting on the rotor by the radial repulsive force Fr2 generated between the rotation shaft connection portion and the stator connection portion.

In this embodiment, a certain clearance is formed between the shaft attachment 250 and the stator attachment 260 due to the repulsive magnetic force generated between them. When the rotor 240 deviates from its equilibrium position, the repulsive magnetic force Fr2, as shown in FIG. 6, generated between the shaft attachment 250 and the stator attachment 260 becomes greater as the magnetic force is proportional to the inverse of the square of the distance. The component force Fx2 pushes the rotor 240 back to its equilibrium position in the radial direction, and the component force Fy2 pushes the rotor 240 back to its equilibrium position in the axial direction.

As can be seen from FIG. 3, there is a stator attachment both below the shaft attachment and above it. Since the distance between the shaft attachment and each stator attachment is the same, inherently the shaft attachment simultaneously interacts with both stator attachments. Similarly, as seen FIG. 5, there is a shaft attachment both below the stator attachment 260 and also above it. Since both shaft attachment are the same distance from stator attachment 260, the stator attachment simultaneously interacts with both shaft attachments.

With the above structure, the present invention has the following advantages:

1. The magnetic clearance formed between the rotor and the bearing can prevent them from direct contact with each other, let the bearing keep in equilibrium, and avoid the noise and vibration caused by friction.

2. Since there is no friction between the rotor and the bearing, the magnetic bearing structure of the invention can lower power consumption and have a long lifetime 3. The structure is simple and easy to manufacture, thus its manufacturing cost can be lowered.

While the invention has been described by way of example and in terms of two preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A magnetic bearing structure for use in a rotating device that comprises a bearing base, a set of coils around a stator mounted on said bearing base, and a rotation shaft mounted on a rotor so that when said set of coils is excited with an electrical current, said rotor rotates, the magnetic bearing structure comprising:

a single magnetic shaft attachment in a convex form and fixed on an outer side of said rotation shaft;

at least two magnetic stator attachments each in a concave form and fixed on an inner side of said stator; and wherein said magnetic bearing structure is used to control a position of said rotor in both a radial direction and an axial direction by repulsive magnetic forces produced when said magnetic shaft attachment simultaneously interacts with said at least two magnetic stator attachments.

2. The magnetic bearing structure of claim 1, wherein said magnetic shaft attachment is made of a permanent magnet.

3. The magnetic bearing structure of claim 1, wherein said magnetic stator attachment is made of a permanent magnet.

4. A magnetic bearing structure for use in a rotating device that comprises a bearing base, a set of coils around a stator mounted on said bearing base, and a rotation shaft mounted on a rotor so that when said set of coils is excited with an electrical current, said rotor rotates, the magnetic bearing structure comprising:

at least two magnetic shaft attachment each in a concave form and fixed on an outer side of said rotation shaft;

a single magnetic stator attachment in a convex form and fixed on an inner side of said stator; and wherein said magnetic bearing structure is used to control a position of said rotor in both a radial direction and an axial direction by repulsive magnetic forces produced when said at least two magnetic shaft attachments simultaneously interact with said magnetic stator attachment.

5. The magnetic bearing structure of claim 4, wherein said magnetic shaft attachment is made of a permanent magnet.

6. The magnetic bearing structure of claim 4, wherein said magnetic stator attachment is made of a permanent magnet.

* * * * *